(12) United States Patent
Scherz

(10) Patent No.: US 11,767,131 B2
(45) Date of Patent: *Sep. 26, 2023

(54) DOCKING STATION FOR UNMANNED AERIAL VEHICLES

(71) Applicant: Christopher Julian Scherz, Miami, FL (US)

(72) Inventor: Christopher Julian Scherz, Miami, FL (US)

(*) Notice: Subject to any disclaimer, the term of this patent is extended or adjusted under 35 U.S.C. 154(b) by 237 days.

This patent is subject to a terminal disclaimer.

(21) Appl. No.: 17/146,207

(22) Filed: Jan. 11, 2021

(65) Prior Publication Data
US 2021/0171218 A1    Jun. 10, 2021

Related U.S. Application Data

(63) Continuation of application No. 16/037,142, filed on Jul. 17, 2018, now Pat. No. 10,899,473.

(60) Provisional application No. 62/533,337, filed on Jul. 17, 2017.

(51) Int. Cl.
*H01M 10/46* (2006.01)
*B64F 1/36* (2017.01)
*H02J 7/00* (2006.01)
*B64C 39/02* (2023.01)

(52) U.S. Cl.
CPC ............ *B64F 1/364* (2013.01); *B64C 39/024* (2013.01); *H02J 7/00* (2013.01); *H02J 7/0042* (2013.01); *H02J 7/0044* (2013.01); *H02J 7/0045* (2013.01)

(58) Field of Classification Search
CPC ...... H02J 7/0042; H02J 7/0045; H02J 7/0044; H02J 7/00; B64C 39/024; B64F 1/364
USPC ................... 320/107, 114, 115, 116
See application file for complete search history.

(56) References Cited

U.S. PATENT DOCUMENTS 10,899,473 B2 *    1/2021    Scherz .................. B64U 50/19

* cited by examiner

*Primary Examiner* — Edward Tso
(74) *Attorney, Agent, or Firm* — McCarter & English, LLP; James M. Smedley; Alex Korona

(57) ABSTRACT

A docking assembly for unmanned aerial vehicles (UAVs). The docking assembly includes a dock having a shaft. The present invention further includes UAVs. Each of the UAVs include a slot sized such that the shaft may slidably engage the slot. The shaft of the dock inserts through the slot of the UAVs, thereby docking the UAVs on the dock.

20 Claims, 4 Drawing Sheets

DOCKING STATION FOR UNMANNED AERIAL VEHICLES

CROSS-REFERENCE TO RELATED APPLICATION

This application is a continuation of U.S. non-provisional application Ser. No. 16/037,142, filed Jul. 17, 2018, which claims the benefit of priority of U.S. provisional application No. 62/533,337, filed Jul. 17, 2017, the contents of each of which are herein incorporated by reference.

BACKGROUND OF THE INVENTION

The present invention relates to unmanned aerial vehicles (UAVs) and, more particularly, to a UAV docking station.

An unmanned aerial vehicle (UAV), commonly known as a UAV, is an aircraft without a human pilot aboard. UAVs are becoming ever more present in society for a wide array of applications, such as inspecting infrastructure, search and rescue missions, and aiding in agriculture. Further, every UAV application would almost certainly benefit in some regard from an automated (or semi-automated) UAV station. Clearly, the ideal UAV station must fulfill various responsibilities. Nevertheless, current UAV stations are limited by their UAV docking mechanism. Currently, most if not all, UAV stations are limited to a single UAV capacity.

As can be seen, there is a need for an improved UAV docking station that may efficiently secure more than one UAV.

SUMMARY OF THE INVENTION

In one aspect of the present invention, a docking assembly for unmanned aerial vehicles comprises: a dock comprising a shaft; and at least one unmanned aerial vehicle comprising a slot, wherein the shaft of the dock inserts through the slot of the at least one unmanned aerial vehicle, thereby docking the at least one unmanned aerial vehicle on the dock.

In another aspect of the present invention, an unmanned aerial vehicle dock comprises: a base comprising an upper surface and a lower surface; a shaft extending from the upper surface of the base, wherein the shaft is configured to insert through a slot of an unmanned aerial vehicle; and a battery charger configured to charge the unmanned aerial vehicle when the shaft is disposed through the slot.

These and other features, aspects and advantages of the present invention will become better understood with reference to the following drawings, description and claims.

DETAILED DESCRIPTION OF THE INVENTION

Figure 1:
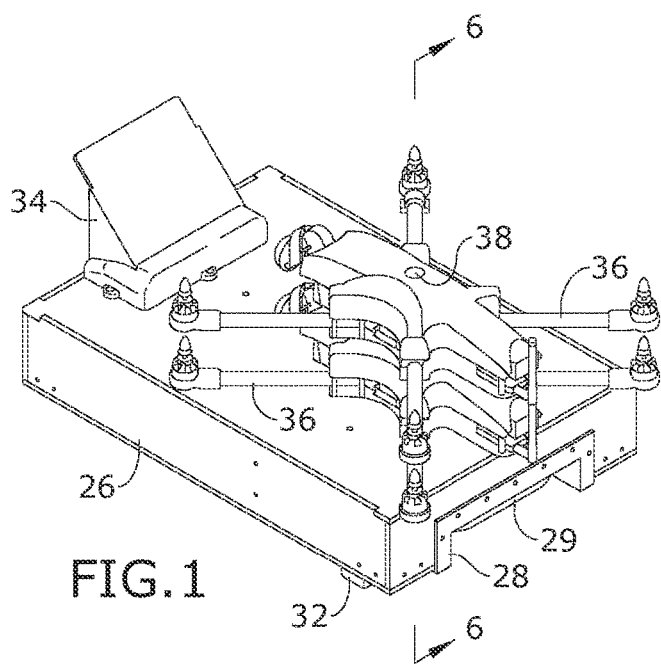
FIG. 1 is a perspective view of an embodiment of the present invention, shown in use.
Figure 2:
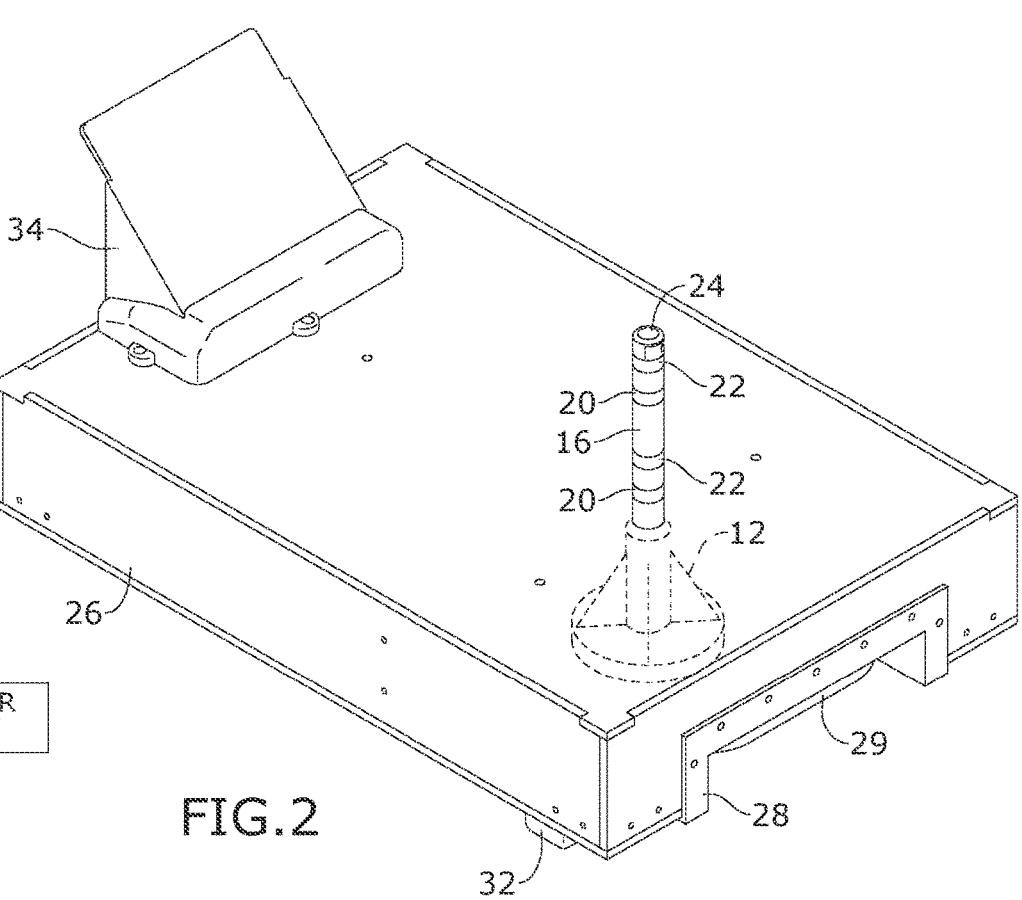
FIG. 2 is a top front perspective view of an embodiment of the present invention.
Figure 3:
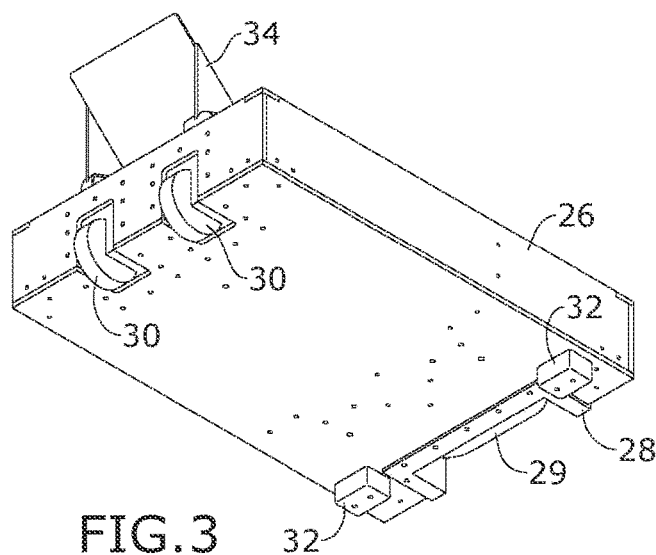
FIG. 3 is a bottom rear perspective view of an embodiment of the present invention.
Figure 4:
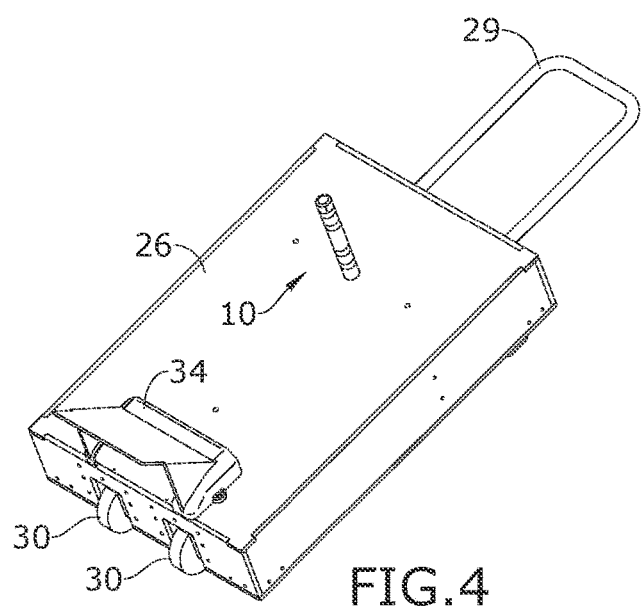
FIG. 4 is a side view of an embodiment of the present invention, shown in a storage configuration.
Figure 5:
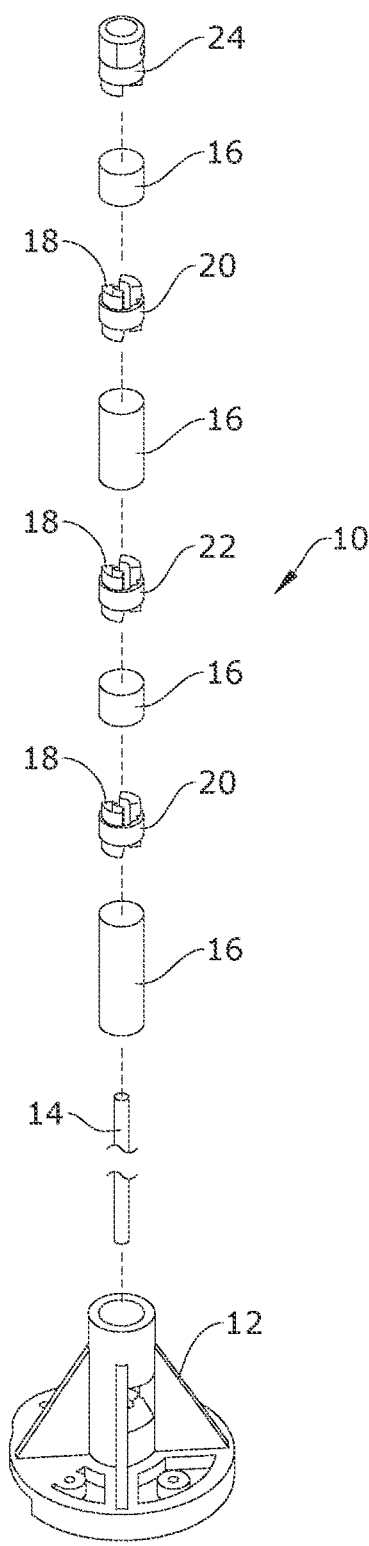
FIG. 5 is a detail exploded view of an embodiment of the present invention.
Figure 6:
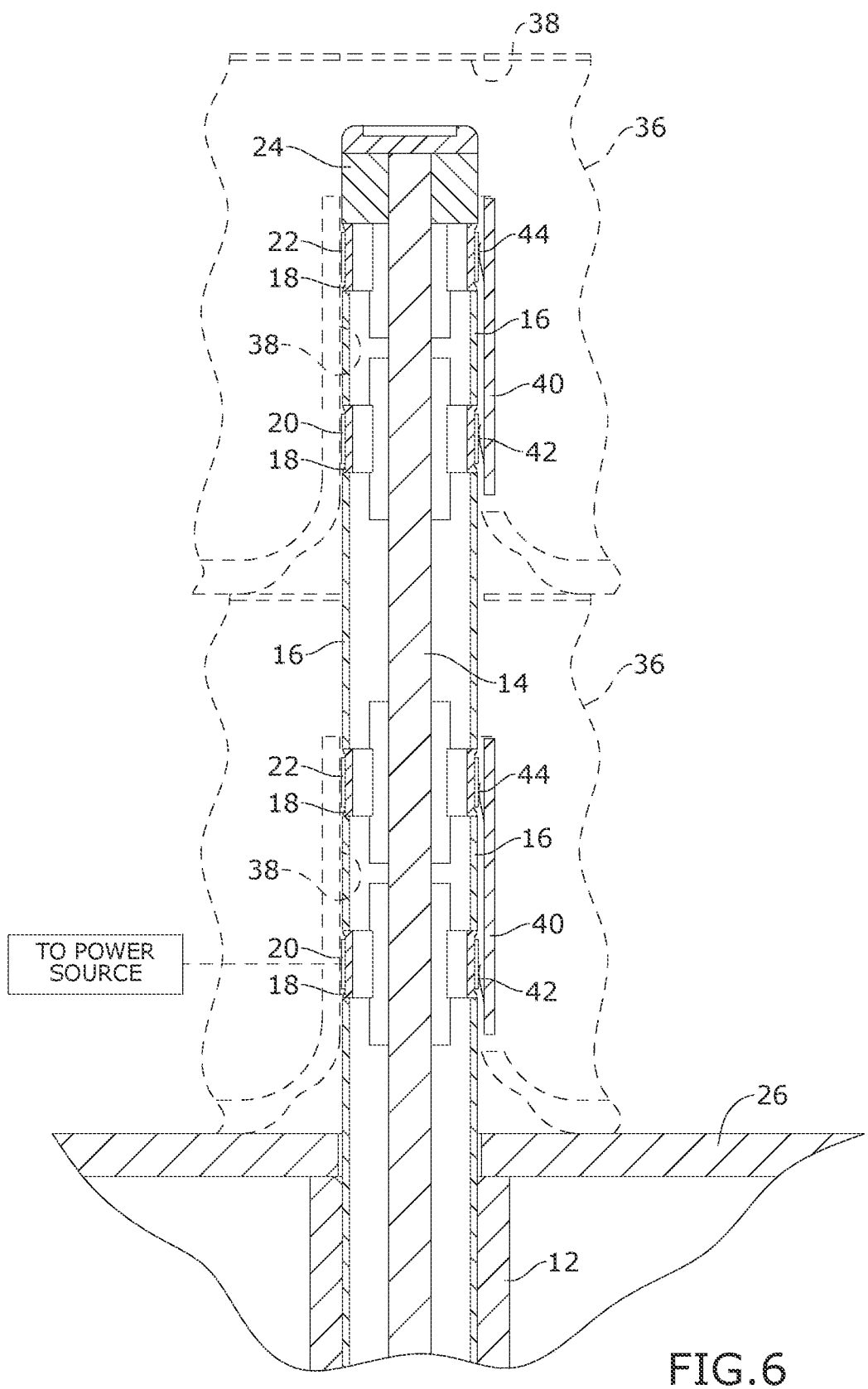
FIG. 6 is section detail view of the present invention, taken along line 6-6 in FIG. 1.
Figure 7:
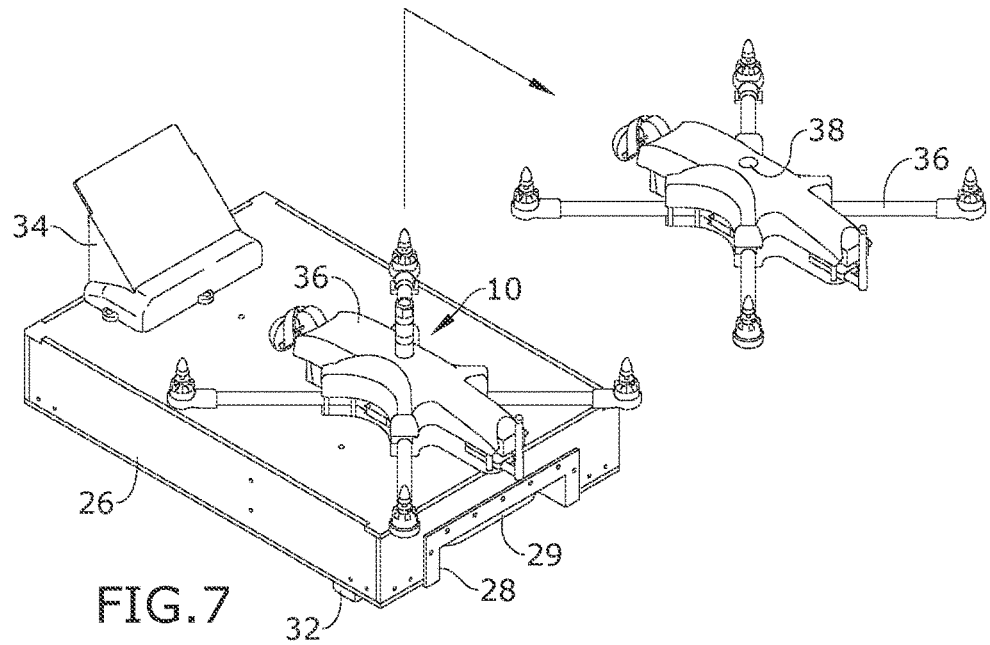
FIG. 7 is a perspective view of an embodiment of the present invention, illustrating the removal of a UAV from a shaft.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a docking station for unmanned aerial vehicles (UAVs). The docking stations stacks, stabilizes, and charges the UAVs. Stacking UAVs allows for more UAVs to be housed in a smaller surface area. The present invention also eliminates the need for legs on a UAV, thus making both, the UAVs and UAV stations, much smaller and more space efficient.

The present invention may include the following benefits. Firstly, while one UAV is in use the others may be charging which results in the first added benefit, which is continuous UAV usage. Secondly, one may use multiple UAVs at the same time resulting in higher productivity in areas such as agriculture and search and rescue missions as well as more viewing angles for inspections or filming. Stacking UAVs in a station allows for a higher UAV supply in the UAV Station Network and therefore a greater ability to meet the demand for UAVs across the network.

Referring to FIGS. 1 through 8, the present invention includes docking assembly for unmanned aerial vehicles 36 (UAVs). The docking assembly includes a dock 10, 26 having a shaft 10. The present invention further includes UAVs 36. Each of the UAVs 36 include a slot 38 sized such that the shaft 10 may slidably engage the slot 38. The shaft 10 of the dock 10, 26 inserts through the slot 38 of the UAVs, thereby docking the UAVs on the dock 10, 26.

The dock 10, 26 further includes a horizontally disposed base 26 having an upper surface and a lower surface. The shaft 10 vertically extends from the upper surface of the base 26. The shaft 10 of the present invention may include a cylindrical shape. The length of the shaft 10 determines how many UAVs 26 can be stacked on the dock 10, 26.

The shaft 10 may further include a battery charger 20, 22 operable to charge a battery of the UAVs 36 when the UAVs 36 are docked. The battery charger 20, 22 may include a positive charge contact ring 20 and a negative charge contact ring 22. In such embodiments, each of the UAVs 36 may include a positive contact tab 42 and a negative contact tab 44 that align with the positive charge contact ring 20 and the negative charge connect ring 22 when the unmanned aerial vehicle 36 is docked.

In certain embodiments, the battery charger 20, 22 includes a plurality of pairs of contact rings, each of the pairs of contact rings including the positive charge contact ring 20 and the negative charge contact ring 22. The plurality of pairs of contact rings are evenly spaced apart along the shaft by spacers 16. This allows multiple UAVs 36 to be stacked on the shaft 10 and to be charged at the same time. A power source is electrically connected to the positive charge contact rings 20 and the negative charge contact rings 22, allowing the battery charger 20, 22 to provide power to the UAVs 36.

The shaft 10 of the present invention may further include a support 12 coupled to the upper surface of the base 26. A solid inner shaft 14 extends upward from the support 12 and provides most of the structural rigidity to the shaft 10. The plurality of spacers 16 and contact mounts 18 may alternate and stack on the inner shaft 14. A cap 24 secures to the top of the inner shaft 14, thereby containing the spacers 16 and contact mounts 18. The positive charge contact rings 20 and the negative charge contact rings 22 are coupled to the contact mounts 18. The spacers 16 space the contact mounts 18 appropriately. Pairs of contact mounts 18 are evenly spaced apart because each UAV 36 has the same predetermined height. The spacers 16 and the inner shaft 14 may be made of a strong lightweight material, such as carbon fiber and the like.

The dock 10, 26 may further includes wheels 30 coupled to the base 26 and extending from the lower surface of the base 26. A plurality of feet 32 may be coupled to and extend from the lower surface of the base 26 to support the dock 10, 26 in an upright position for landing and deploying of UAVs 36. The present invention may further include a handle 28 coupled to the base 10, 26. The handle 28 is extendable and retractable from the base 10, 26. The handle 28 may be disposed on an opposing side of the wheels 30. Therefore, a user may transport the dock 10, 26 by extending the handle 28 and rolling the dock 10, 26 by the wheels 30. The dock 10, 26 may further include a balancer foot 34 extending from the upper surface of the base 26 and disposed on the same side as the wheels 20. Therefore, the user may prop up the base 26 in a stowed position.

The UAVs 36 may each include centrally disposed slots 38 that fit over the shaft 10. For example, the slots 38 may be formed through the UAVs 36 near its center of mass. Each of the UAVs 36 may include charging printed circuit board 40 (PCB) disposed within the slot 38. The charging PCB 40 includes the positive contact tabs 42 and the negative contact tabs 44. The contact tabs 42, 44 may be spring loaded mechanisms that are designed to push the contacts tabs 42, 44 towards the charging shaft 10 and onto the positive charge contact ring 20 and the negative charge contact ring 22 respectively when the UAV 36 is docked.

During the docking process, the UAV 36 uses an embedded camera and a visual cue on the dock 10, 26 (such as an aruco tag) to localize itself and align itself over the docking shaft 10. The UAV 36 lowers to the lowest available position to end the docking sequence. The undocking process simply involves the top-most UAV 36 starting its motors and lifting itself off the shaft 10. While the UAVs 36 are docked, the power source supplies power to the shaft 10 which is then distributed to the UAVs 36.

In alternate embodiments, spring loaded contacts 42, 44 in the charging slot 38 on the UAV 36 may be rigidly mounted onto the UAV 36. Furthermore, there are some design additions that could improve performance, such as, but not limited to, a linear bearing in-line with the charging slot 38 to decrease friction and increase ease of docking, and a magnet placed at the tip of the charging shaft 10 and at the base of the UAV slot 38 to add passive magnetic alignment. This would increase the ease of docking. Alternatively, a set of magnets placed in such a manner where the magnetic field still pulls the docking shaft tip towards the UAV docking slot.

Figure 8:
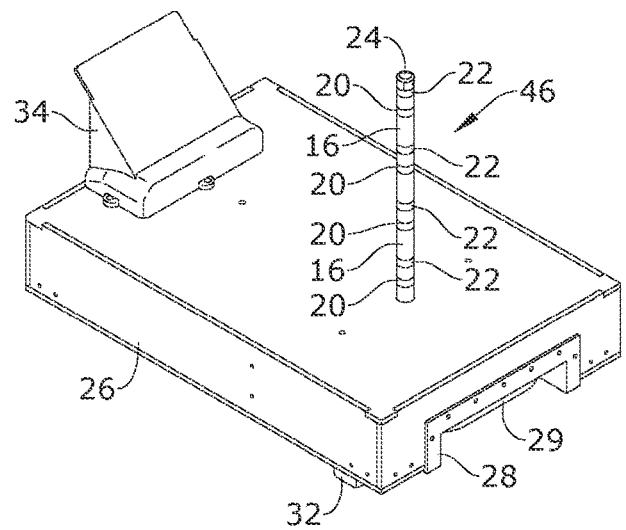
FIG. 8 is a perspective view of an embodiment of the present invention.
Figure 9:
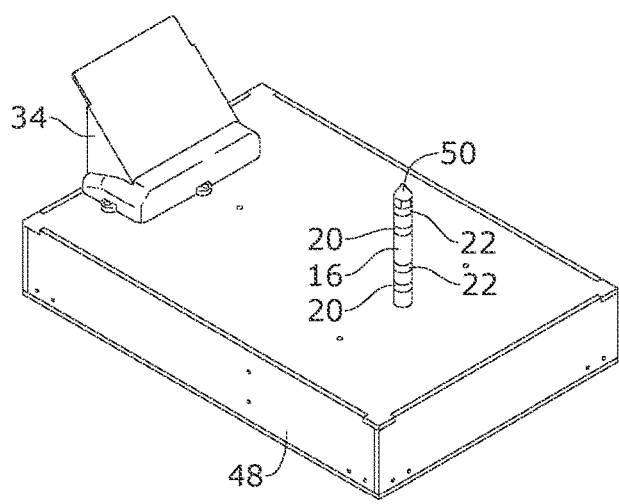
FIG. 9 is a perspective view of an embodiment of the present invention.

Referring to FIG. 8, the present invention may include an elongated shaft 46 having contact rings 20, 22 to dock and charge four or more UAVs 36. Referring to FIG. 9, an alternative base 48 may not include the handle 28 and the wheels 30.

The docking mechanism described herein could be used in various larger assembly's and in countless applications. The docking mechanism may be integrated in a fully functional UAV station with capabilities including but not limited to: UAV charging, weather protection, theft protection, and autonomous docking and undocking. Furthermore, the present invention may include an accompanying website or app based interface through which users are able to make use of the UAVs for their various applications. Depending on the application, the user may desire to control the UAV by hand, using a UAV remote control interface, or to have the UAV fly autonomously through a preplanned flight.

It should be understood, of course, that the foregoing relates to exemplary embodiments of the invention and that modifications may be made without departing from the spirit and scope of the invention as set forth in the following claims.

What is claimed is:

1. An unmanned aerial vehicle system comprising:
one or more unmanned aerial vehicles, wherein at least a first unmanned aerial vehicle of the unmanned aerial vehicles is formed with a docking slot through a central body portion of the first unmanned aerial vehicle.

2. The unmanned aerial vehicle system of claim 1, wherein the docking slot is a channel passing from a top side of the first unmanned aerial vehicle through to a bottom side of the first unmanned aerial vehicle.

3. The unmanned aerial vehicle system of claim 2, wherein the docking slot is configured with a magnetic aligner at the bottom side of the first unmanned aerial vehicle.

4. The unmanned aerial vehicle system of claim 1, wherein the docking slot is formed near a center of mass of the first unmanned aerial vehicle.

5. The unmanned aerial vehicle system of claim 1, wherein the docking slot is configured with a positive contact tab and a negative contact tab to facilitate electrical charging of the first unmanned aerial vehicle.

6. The unmanned aerial vehicle system of claim 1, further comprising a docking platform with a shaft that is configured to reversibly engage with the docking slot of any of the unmanned aerial vehicles.

7. The unmanned aerial vehicle system of claim 6, wherein the shaft is configured with a magnetic tip portion to facilitate alignment with the docking slot.

8. An unmanned aerial vehicle system comprising:
a dock comprising a shaft configured with one or more positive charge contact rings and one or more a negative charge contact rings; wherein each of the positive charge contact rings is configured to electrically connect to a positive contact tab on an unmanned aerial vehicle and each of the negative charge contact rings is configured to electrically connect to a negative contact tab on the unmanned aerial vehicle.

9. The unmanned aerial vehicle system of claim 8, wherein each of the positive charge contact rings and each of the negative charge contact rings are coupled to a contact mount.

10. The unmanned aerial vehicle system of claim 9, wherein the shaft is further configured with one or more spacers that are configured to provide separation between the contact mounts.

11. The unmanned aerial vehicle system of claim 10, wherein the shaft is configured with an inner shaft on which the contact mounts and spacers are stacked.

12. The unmanned aerial vehicle system of claim 8, further comprising one or more unmanned aerial vehicles, wherein at least a first unmanned aerial vehicle of the unmanned aerial vehicles is formed with a docking slot configured to receive the shaft of the dock.

13. The unmanned aerial vehicle system of claim 12, wherein the docking slot is configured with a magnetic aligner and the shaft is configured with a magnetic tip that collectively interact to align the first unmanned aerial vehicle onto the shaft.

14. The unmanned aerial vehicle system of claim 12, wherein the docking slot is a channel formed through a central body portion of the first unmanned aerial vehicle that extends from a top side of the first unmanned aerial vehicle through to a bottom side of the first unmanned aerial vehicle.

15. An unmanned aerial vehicle system comprising:
 one or more unmanned aerial vehicles each formed with a docking slot through a central body portion of each the unmanned aerial vehicles; and
 a dock comprising a shaft configured to insert into the docking slot of each of the unmanned aerial vehicles, wherein the shaft comprises one positive charge contact ring and one negative charge contact ring for each of the unmanned aerial vehicles.

16. The unmanned aerial vehicle system of claim 15, wherein the docking slot of each of the unmanned aerial vehicles is configured with a positive contact tab that is configured to electrically connect with the positive charge contact ring and a negative contact tab that is configured to electrically connect with the negative charge contact ring.

17. The unmanned aerial vehicle system of claim 15, wherein the docking slot of each of the unmanned aerial vehicles is configured with a magnetic aligner and the shaft is configured with a magnetic tip that collectively interact to align each of the unmanned aerial vehicle onto the shaft.

18. The unmanned aerial vehicle system of claim 15, wherein the shaft is further configured with one or more spacers that are configured to provide separation between the positive contact ring and the negative contact ring.

19. The unmanned aerial vehicle system of claim 15, wherein the unmanned aerial vehicles are configured to stack vertically on the dock with the shaft extending through the docking slot formed in each of the unmanned aerial vehicles.

20. The unmanned aerial vehicle system of claim 19, wherein the shaft stabilizes the unmanned aerial vehicles in vertical stack configuration while providing an electrical charge to each of the unmanned aerial vehicles in the vertical stack configuration.

* * * * *